US011973787B2

(12) United States Patent
Compagna et al.

(10) Patent No.: US 11,973,787 B2
(45) Date of Patent: Apr. 30, 2024

(54) DETECTING WEB APPLICATION VULNERABILITIES

(71) Applicant: SAP SE, Walldorf (DE)

(72) Inventors: Luca Compagna, La Roquette sur Siagne (FR); Alessandro Pezze, Calliano (IT)

(73) Assignee: SAP SE, Walldorf (DE)

( * ) Notice: Subject to any disclaimer, the term of this patent is extended or adjusted under 35 U.S.C. 154(b) by 1062 days.

(21) Appl. No.: 16/351,955

(22) Filed: Mar. 13, 2019

(65) Prior Publication Data

US 2020/0296126 A1    Sep. 17, 2020

(51) Int. Cl.
G06F 9/44 (2018.01)
G06F 11/36 (2006.01)
H04L 9/40 (2022.01)

(52) U.S. Cl.
CPC ...... *H04L 63/1433* (2013.01); *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3692; H04L 63/1433; H04L 29/06
See application file for complete search history.

(56) References Cited

U.S. PATENT DOCUMENTS 7,194,761 B1 *   3/2007  Champagne ............ H04L 63/08
                                                                713/168
8,601,586 B1 *  12/2013  Boutros .............. H04L 63/1433
                                                                709/224
2007/0101034 A1 *   5/2007  Ta .......................... G06F 11/366
                                                                710/48

(Continued)

OTHER PUBLICATIONS

"European Application Serial No. 19 200 801.9, Extended Search Report dated Mar. 24, 2020", 9 pgs.

(Continued)

*Primary Examiner* — Hang Pan
*Assistant Examiner* — Lenin Paulino
(74) *Attorney, Agent, or Firm* — SCHWEGMAN LUNDBERG & WOESSNER, P.A.

(57) ABSTRACT

Various examples are directed to systems and methods for detecting vulnerabilities in a web application. A testing utility may direct a plurality of request messages to a web application. The testing utility may be executed at a first computing device and the web application may be executed at a second computing device. The testing utility may determine that a first request message of the plurality of test messages describes a state changing request. The determining may be based at least in part on the first request message and a first response message generated by the web application in response to the first request message. The testing utility may generate a first tampered request message based at least in part on the first request message and direct the first tampered request message to the web application. The testing utility may determine that the first request message indicates a vulnerability of the web application, the determining based at least in part on the first tampered request message and a first traffic-tampered response message generated by the web application in response to the first tampered request message.

15 Claims, 5 Drawing Sheets

(56) References Cited

U.S. PATENT DOCUMENTS

| | | | |
|---|---|---|---|
| 2013/0174239 A1* | 7/2013 | Kim | H04L 63/205 |
| | | | 726/7 |
| 2017/0109534 A1* | 4/2017 | Compagna | G06F 21/577 |
| 2018/0124043 A1* | 5/2018 | Chester | H04L 9/3242 |
| 2018/0255089 A1* | 9/2018 | Wilton | H04L 63/1433 |
| 2018/0349602 A1* | 12/2018 | Johns | G06F 21/552 |
| 2019/0334940 A1* | 10/2019 | Bar Noy | H04L 43/04 |

OTHER PUBLICATIONS

"OWASP ZAP—Getting Started", ZAP Dev Team, [Online]. Retrieved from the Internet: (Accessed May 15, 2020), 14 pgs.

"Solution Manager 7.2 Test Suite is now the recommended Test Management tool for SAP customers", Core ALM, [Online]. Retrieved from the Internet: <URL: Solution manager 7.2 test suite is now the recommended test management tool for sap customers/>, (Accessed Mar. 30, 2020), 11 pgs.

Brian, "Best Automation Testing Tools for 2020", Medium Corporation, [Online]. Retrieved from the Internet: (Oct. 26, 2017), 12 pgs.

Pellegrino, Giancarlo, et al., "Deemon: Detecting CSRF with dynamic analysis and property graphs", CCS. Session H3: Web Security, (2017), 1757-1771.

Sudhodanan, Avinash, et al., "Attack Patterns for Black-Box Security Testing of Multi-Party Web Applications", 23nd Annual Network and Distributed System Security Symposium, (2016), 15 pgs.

Sudhodanan, Avinash, et al., "Large-scale Analysis & Detection of Authentication Cross-Site Request Forgeries", 2017 IEEE European Symposium on Security and Privacy, (2017), 350-365.

* cited by examiner

DETECTING WEB APPLICATION VULNERABILITIES

TECHNICAL FIELD

This document generally relates to methods and systems for use with computer devices, including networked computing devices. More particularly, this document relates to systems and methods for detecting web application vulnerabilities.

BACKGROUND

A user computing device can utilize a web application executing at a remote computing device, for example, using a client web browser. The client web browser provides request messages, such as Hypertext Transfer Protocol (HTTP) request messages to the web application. The request messages can request that the web application perform various different actions. In some examples, a web application is vulnerable to Cross-Site Request Forgery (CSRF) attacks. In a CSRF attack, an attacker tricks the client web browser into sending surreptitious request messages. If the web application cannot distinguish between surreptitious request messages from an attacker and legitimate request messages from a user, it may perform unauthorized actions.

BRIEF DESCRIPTION OF DRAWINGS

The present disclosure is illustrated by way of example, and not limitation, in the following figures.

DETAILED DESCRIPTION

Figure 1:
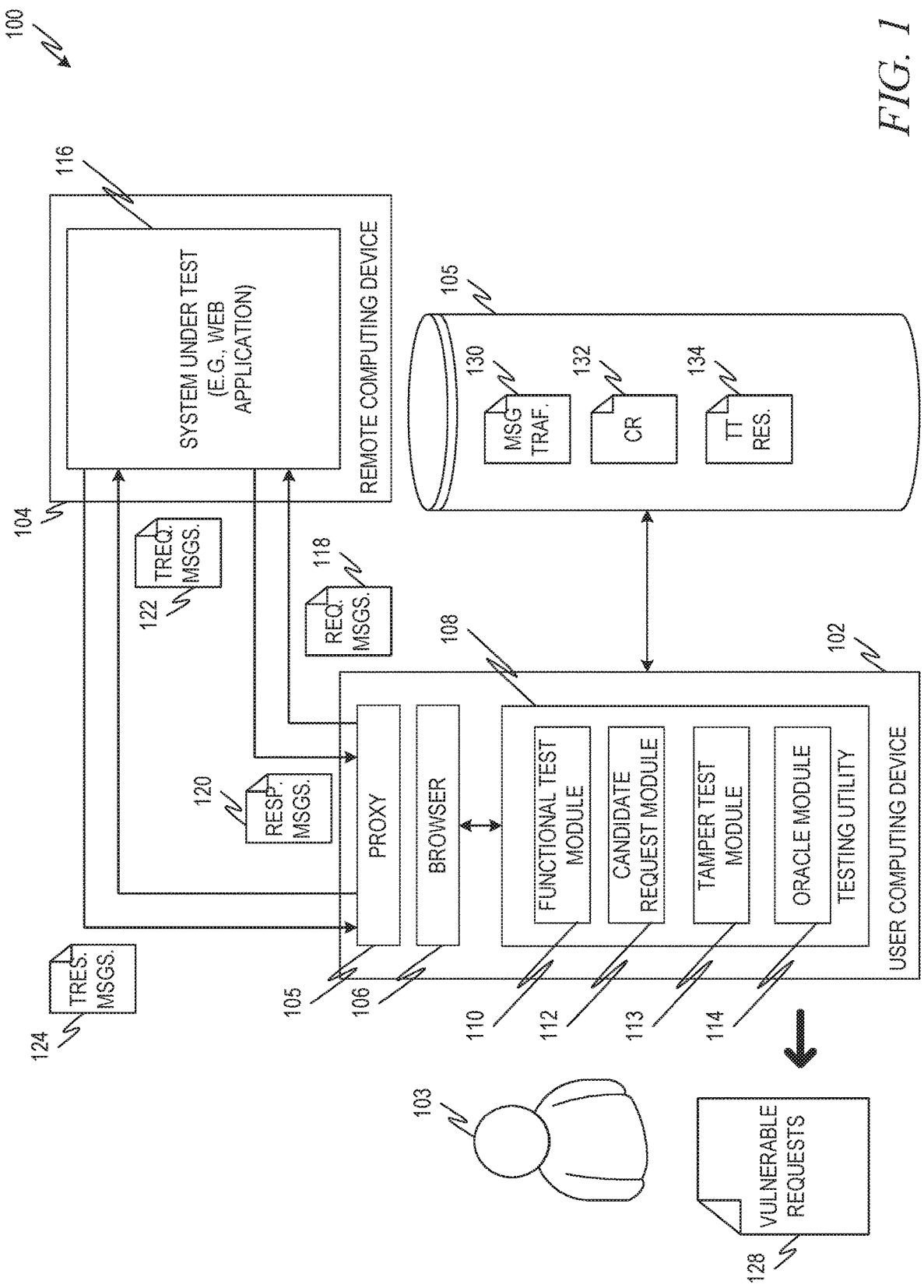
FIG. 1 is a diagram showing one example of an environment for detecting web application vulnerabilities.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods that for detecting web application vulnerabilities such as, for example, vulnerabilities to CSRF and/or similar attacks. There are various mitigation techniques that can be used in the design of a web application to reduce or eliminate the vulnerability of the web application to CSRF and/or similar attacks. Some techniques include the use of session-specific tokens with request messages. Other techniques utilize origin headers in request messages to determine the source and target origins of request messages. (E.g., the web application can discard request messages for which the source and target origins do not match.) Various other techniques can be used.

Despite the availability of CSRF mitigation techniques, not all web applications are adequately protected. For example, CSRF mitigation techniques can be expensive, causing developers to implement CSRF techniques only when needed. If the developer does not adequately understand where CSRF techniques are needed, the resulting web application may be vulnerable. Also, in some examples, CSRF mitigation techniques may be complex. As a result, developers may implement the techniques imperfectly in a way that maintains vulnerability to CSRF and/or similar attacks.

To address these and other reasons various examples described herein are directed to systems and methods for detecting the vulnerability of a web application to CSRF and/or similar attacks. A user computing device executes a testing utility and a client, which may be or include a web browser. A web application, also referred to as a system under test (SUT) executes at a remote computing device. The testing utility executes a set of one or more functional tests. Executing a functional test can include sending one or more request messages to the SUT and receiving a response message. The request message/response message pairs are stored for further analysis.

From the request message/response message pairs generated during the functional test or tests, the testing utility identifies requests that change the state of the SUT and/or change the state of the user relative to the SUT. These requests are referred to herein as state-changing requests or candidate requests (CRs). State-changing requests are identified for further vulnerability testing, as described herein. The testing utility can identify state-changing requests by applying a set of one or more heuristic criteria to the request and response message pairs.

Upon identifying state-changing requests, the testing utility executes one or more tamper tests using the state-changing requests. The testing utility takes a request message determined to be state-changing and generates a corresponding tampered request message by modifying the body, headers, or other aspects of the request message. In some examples, the testing utility performs different modifications based on whether the state-changing message is pre-authentication or post-authentication. A post-authentication request message may be modified to replace a portion of the body of the message. For example, the post-authentication message may be modified to replace unguessable information that an attacker could not forge.

The testing utility can re-run the functional test associated with a state-changing request, albeit with the corresponding tampered request message. In response, the SUT provides corresponding response messages to tampered requests. These responses are referred to herein as traffic-tampered responses. The testing utility analyzes the tampered traffic to identify potentially vulnerable requests. For example, the testing utility may detect a vulnerability if the traffic-tampered response message is equivalent to the original response message returned by the SUT in response to an un-tampered request message and/or if the testing utility may determine a vulnerability if the re-run functional test indicates successful execution.

FIG. 1 is a diagram showing one example of an environment 100 for detecting web application vulnerabilities. The environment 100 includes a user computing device 102 in communication with a remote computing device 104. The user computing device 102 may be or include any suitable computing device, such as, for example, a desktop computer, a laptop computer, a tablet computer, a mobile phone, etc. The user computing device 102 is in communication with a data store 105 that may include any suitable data storage hardware. In some examples, the data store 105 is or includes a database. The remote computing device 104 may be or include any suitable computing device such as, for example, a web server or web servers. Examples of hardware and software arrangements for computing devices that may make up all or part of the user computing device 102 and/or remote computing device 104 are provided herein with reference to FIGS. 4 and 5 described herein.

The remote computing device 104 executes a system under test (SUT) 116, which may be or include all or part of a web application. For example, the SUT may include one or more web application routines executed at the remote computing device 104 that provide content and/or perform operations in response to request messages sent from the user computing device 102.

In the example shown in FIG. 1, the user computing device 102 executes a browser 106. The browser 106 may be or include any suitable web browser including, for example, the Chrome) browser available from Google Inc., the Firefox® browser available from Mozilla Foundation, the Safari, browser available from Apple Inc., the Internet Explorer) browser available from Microsoft Corporation, the Microsoft Edge, browser available from Microsoft Corporation. The browser 106 interfaces a user 103 to the SUT 116. In some examples, the browser 106 communications with the SUT 116 via a proxy 105 that may also be executed at the user computing device 102. For example, the browser 106 may display content received from the SUT 116. The browser 106 may also provide hyperlinks and/or other user interface elements that, when selected by the user 103, cause the browser 106 to send a request message 118 to the SUT 116. In some examples, some or all of the web application is executed at the client-side (e.g., in the browser 106). For example, the SUT 116 may provide script or other suitable code to the browser 106 for execution at the browser 106.

Consider an example in which the SUT 116 is a financial web application providing the user 103 with management functionality related to the user's bank accounts. The SUT 116 may provide user interface content including data about the bank accounts of the user 103. The user 103 can select a user interface element to generate and/or prompt a request message directed to the SUT 116 that requests a particular action related to the bank accounts such as, for example, a deposit, a withdrawal, a transfer, etc.

In addition to the browser 106, the client computing device 102 executes a testing utility 108. The testing utility 108 includes a functional test module 110, a candidate request module 112, a tamper test module 113, and an oracle module 115. The functional test module 110 is configured to execute one or more functional tests at the SUT 116. Executing a functional test can include sending one or more request messages 118 to the SUT 116. For example, the functional test module 110 may perform an action in the web application such as, for example, clicking on a button in a user interface, filling in a field, etc. This may trigger the browser 106 and/or the proxy 105 to generate and send request messages 118 to the SUT 116. The request messages 118 request that the SUT 116 perform a requested action such as, for example, logging-in to an account associated with the user 103, performing an action related to the account, etc. In response to the request messages 118, the SUT 116 generates response messages 120. Request messages 118 and response messages 120 are stored at the data store 105 as message traffic 130.

The candidate request module 112 reviews the message traffic 130 and detects state-changing requests 132. State-changing requests 132, as described herein, correspond to request messages that change the state of the user 103 and/or of the SUT 116. The tamper test module 113 executes tamper tests, for example, by generating tampered versions of the state-changing requests 132 and causes the tampered request messages 122 to be sent to the SUT 116. The tamper test module 113 may create and load rules for generating tampered versions of the state changing requests 132 to the proxy 105, which may execute the loaded rules to generate tampered requests. In some examples, tamper tests mirror the functional tests performed by the functional test module 110, albeit with tampered request messages 122. In response to the tampered request messages 122, the SUT 116 generates traffic-tampered response messages 124. Results 134 of the tamper tests are stored at the data store 105. The results can include pairs of tampered request messages 122 and traffic-tampered response messages 124 as well as, for example, indicators of success or failure of the tamper tests. An oracle module 114 analyzes the results 134 of the tamper tests and generates an indication 128 of vulnerable requests, as described herein.

Figure 2:
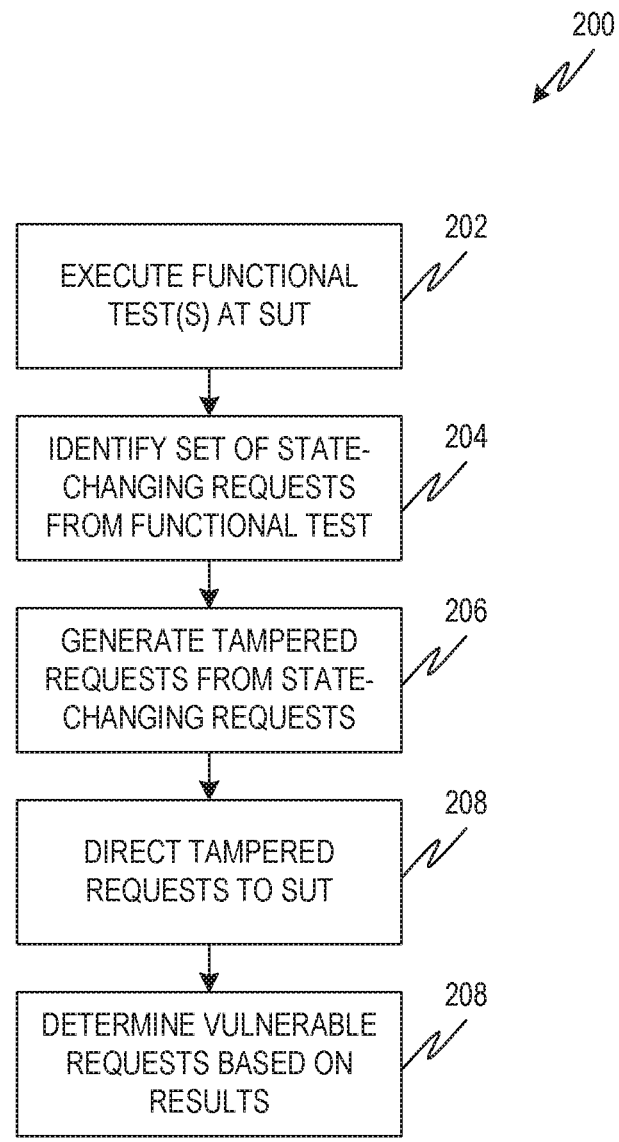
FIG. 2 is a flowchart showing one example of a process flow that can be executed in the environment of FIG. 1 to detect web application vulnerabilities.

FIG. 2 is a flowchart showing one example of a process flow 200 that can be executed in the environment 100 to detect web application vulnerabilities. At operation 202, the testing utility 108 (e.g., the functional test module 110 thereof) executes one or more functional tests at the SUT 116. Executing a functional test can include taking actions that cause the browser 106 to send one or more request messages 118 to the SUT 116 and receive response messages 120 therefrom. Message traffic 130 may be stored at a data store 105 accessible to the user computing device 102.

At operation 204, the testing utility (e.g., the candidate request module 112 thereof) examines the message traffic 130 resulting from the functional tests and identifies a set of one or more state-changing requests 132. At operation 206, the testing utility 108 (e.g., the tamper test module 113 thereof) generates one or more tampered requests, for example, by modifying the state-changing requests among the request messages 118 at operation 204. The tampered requests can be generated, for example, by providing rules for tampering the requests to the proxy 105, which may implement the rules to tamper received requests.

At operation 208, the testing utility 108 (e.g., the tamper test module 113 thereof) directs the tampered request messages 122 to the SUT 116 and may receive traffic-tampered response messages 124 in response. At operation 208, the testing utility 108 (e.g., the oracle module 114 thereof) determines vulnerable requests (if any) based on the reaction of the SUT 116 to the tampered request messages 122.

Figure 3:
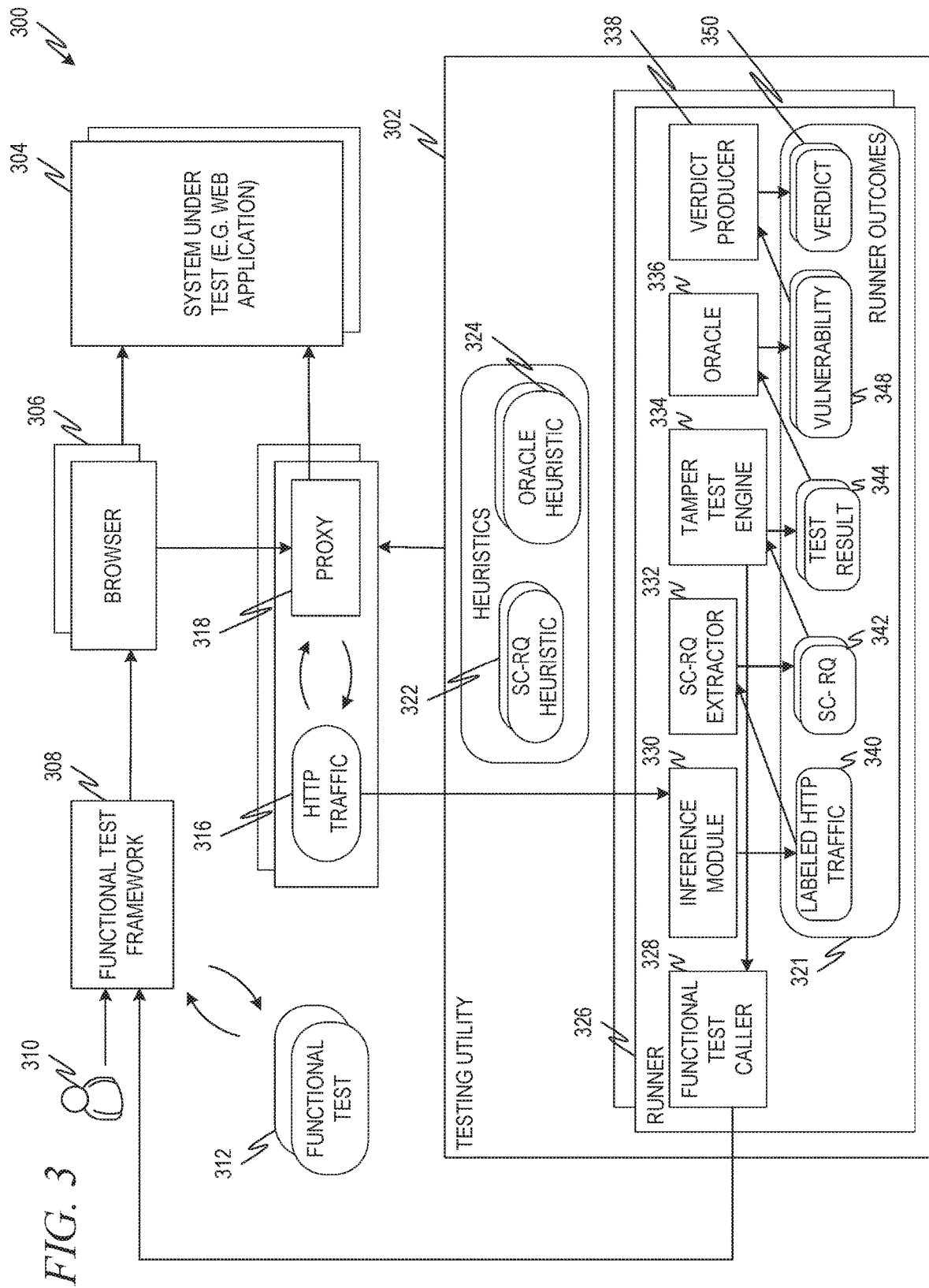
FIG. 3 is a diagram showing another example of an environment for detecting web application vulnerabilities.

FIG. 3 is a diagram showing another example of an environment 300 for detecting web application vulnerabilities. The environment 300 includes a testing utility 302 that may be executed at a user computing device, such as 106 in FIG. 1. A browser 306, proxy 318, and functional test framework 308 may also be executed at the user computing device. A system under test (SUT) 304, which may be or include a web application, is executed at a remote computing device, such as 104 described herein.

Example operation of the testing utility 302 is illustrated by the example code LISTING 1 below:

```
LISTING 1:
1   test_utility(id):
2       runner = getRunner( )
3       proxy = runner.getProxy( )
4       outcome.l_ft = runner.FTC.getFTs(id)
5       outcome.l_traffic = [ ]
6       for ft in outcome.l_ft:
7           (traffic, exitcode) = runner.FTC.runFT(ft, proxy)
8           if not exitcode==0:
9               return ERROR
10          outcome.l_traffic.append(traffic)
11      outcome.l_labelled = runner.inference(outcome.l_traffic)
12      outcome.l_cr = runner.extractCR(outcome.l_labelled)
13      for cr in outcome.l_cr:
14          cr.test.ft = getFT(cr, outcome)
15          cr.test.labelled = getLabelledTraffic(ft, out)
16          cr.test.results = runner.csrfTest(cr)
17          if runner.csrfOracle(cr.test):
18              cr.test.vuln = True
19      return runner.produceVerdicts(outcome)
```

At line 2 of example LISTING 1, the testing utility 302 executes a runner 326. A runner 326 may include a thread or threads that are configured to detect vulnerabilities in a SUT 304. In some examples, additional runners can execute concurrent with the runner 326 to detect vulnerabilities in additional SUTs. At line 3, the runner 326 is associated with a proxy, in this example, the proxy 318. At line 4, a functional test caller 328 of the runner 326 is called to get the functional tests 312 associated with the SUT 304. In the example of LISTING 1, the functional tests 312 are stored in a list called 1_ft with an outcome data structure 321. The outcome data structure 321, in some examples, is stored at a database and can include one or more tables. At line 5, a list of HTTP traffic 316 resulting from the functional tests 312 is initialized within the outcome data structure 321.

At lines 6-10, the functional test caller 328 is called to run each of the retrieved functional tests 312 over the proxy 318. The result of a functional test 312 may include HTTP traffic 316 such as, for example, the request message and response message pair. In some examples, a functional test 312 fails. A functional test may fail, for example, if one or more success criteria for the functional test 312 are not met. If a functional test fails 312, this may also be stored, for example, at the outcome structure. At line 11, an inference module 330 is called to process the HTTP traffic 316. For example, the inference module 330 may label the HTTP traffic 316 as described herein to generate labeled HTTP traffic 340 at the outcome data structure 321. At line 12, a state-changing request extractor 332 is called to detect state-changing requests 342 from the labeled HTTP traffic 340.

Lines 13-18 are performed for each state-changing request 342. At line 14, the functional test 312 associated with a state-changing request 342 is retrieved from the outcome data structure 321 and stored as part of a tamper test. At line 15, the labeled HTTP traffic 340 associated with the state-changing request 342 is retrieved and also stored as part of the tamper test. At line 16, a tamper test engine 334 is called to execute the tamper test, for example, by generating tampered request messages as described herein. Results 344 of the tamper test are written to the outcome data structure 321. At lines 17-18, an oracle module 335 is called to analyze the test results 344, as described herein, and generate vulnerability data 348, which may also be stored at the outcome data structure 321. The vulnerability data 348 may indicate state-changing requests 342 that are vulnerable to a CSRF and/or similar attack. As described in more detail herein, the oracle module 336 may utilize one or more oracle heuristic criteria 324 to identify vulnerable requests.

At line 19, a verdict producer 338 is called to return verdict data 350. The verdict data 350, for example, may include a representation of the vulnerable requests indicated by the vulnerability data 348, for example, in a format, such as JavaScript Object Notation (JSON) that is consumable by a suitable user interface. Resulting verdict data 350, in some examples, is also stored at the outcome data structure 321.

As described herein, the functional test caller 328 invokes the functional test framework 308 to execute a set of functional tests 312 for the SUT 304. In some examples, the functional tests 312 are selected based on the SUT 304. In some examples, functional tests can be generated by recording the actions of one or more users 310 of the SUT 304 performed, for example, using the browser 306. The recorded actions can be expressed as a scripted set of commands that can be re-run at the SUT 304. An example functional test 312 expressed in Python script is provided by LISTING 2 below:

```
LISTING 2:
1   # -*- coding: utf-8 -*-
2   from selenium import webdriver
3   from selenium.webdriver.common.by import By
4   from selenium.webdriver.common.keys import Keys
5   from selenium.webdriver.support.ui import Select
6   from selenium.common.exceptions import NoSuchElementException
7   from selenium.common.exceptions import NoAlertPresentException
8   import unittest, time, re
9
10  desired_capability = webdriver.DesiredCapabilities.FIREFOX
11  desired_capability['proxy'] = {
12      "proxyType": "manual",
13      "httpProxy": '127.0.0.1:8080',
14      "sslProxy": '127.0.0.1:8080'
15  }
16  desired_capability['acceptInsecureCerts'] = True
17  desired_capability['acceptSslCerts'] = True
18
19  class UntitledTestCase(unittest.TestCase):
20      def setUp(self):
21          self.driver = webdriver.Firefox(capabilities=desired_capability)
22          self.driver.implicitly_wait(30)
```

LISTING 2:

```
23        self.verificationErrors = [ ]
24        self.accept_next_alert = True
25
26    def test_untitled_test_case(self):
27        driver = self.driver
28        driver.get("https://account.somewebsite.com/login")
29        driver.find_element_by_id("username").click( )
30        driver.find_element_by_id("username").clear( )
31        driver.find_element_by_id("username").send_keys("test1@example.com")
32        driver.find_element_by_name("password").click( )
33        driver.find_element_by_name("password").clear( )
34        driver.find_element_by_name("password").send_keys("TestTest1")
35        driver.find_element_by_xpath("//div[3]/div/button").click( )
36        self.assertEqual("Test1", driver.find_element_by_link_text("Test1").text)
37        driver.find_element_by_xpath("//span[2]").click( )
38        driver.find_element_by_link_text("Logout").click( )
39
40    def tearDown(self):
41        self.driver.quit( )
42        self.assertEqual([ ], self.verificationErrors)
43
44  if__name__=="__main__":
45      unittest.main( )
```

A functional test, such as the example of LISTING 2, can be executed by the functional test framework 308 using a browser 306 and, in some examples, a proxy 318. LISTING 2 shows a functional test that has a user, such as the user 310, authenticate, log-in, and log-out of the SUT 304. In the Example of LISTING 2, lines 11-15 identify the proxy 318 to be used for the functional test. Line 21 shows the instantiation of the client or browser 306 that, in this example, is the Firefox®® browser available from Mozilla Foundation.

Test user actions are set forth from likes 28-39. The test user actions result in test request messages being sent to the SUT 304, in this example via proxy 318. For example, line 28 prompts a request message requesting a load of the URL https://account.somewebsite.com/login. Lines 29-39 prompt request messages that emulate the user 310 clicking or otherwise selecting a field labeled "username," clearing the field "username," and then writing a string "test 1@example.com" into the field "username." Lines 32-34 prompt request messages that emulate the user 310 clicking or otherwise selecting a field labeled "password," clearing the field "password," and then writing a string "TestTest1" to the field "password." Line 35 prompts a request message corresponding to the user clicking or otherwise selecting a sign-in button. Lines 37-38 prompt request messages corresponding to the user 310 signing out. The example functional test shown by LISTING 2 may be changed, as described herein, to be executable for another user, for example, by substituting another user name and password at lines 31 and 34, respectively.

Functional tests 312, including the example functional test shown by LISTING 2, may be associated with success criteria that indicate whether the request messages sent to the SUT 304 achieved the desired result at the SUT. In the example of LISTING 2, a success criterion variable self.assert is set at line 36 if the user name is found on the page provided by the SUT 304. Other functional tests 312 may have different success criteria, for example, based on the nature of the test. For example, a functional test 312 for updating cookies may include a success criterion that is true if the requested cookies are returned.

The functional test caller 328, in some examples, consumes an application program interface (API) exposed by the functional test framework 308. For example, the functional test caller may request, via the API, that the functional test framework 308 run one or more functional tests 312 over a proxy, such as the proxy 318. API may also include commands by which the functional test caller 328 can get all of the functional tests 312 that are associated with a particular SUT 304 and poll the status of functional tests 312 executed in the functional test framework 308. The example code LISTING 3 below shows example functional test caller 328 functions:

LISTING 3:

```
1   getFTs(id):
2       ftf = getFTF( ) # get the Functional Test Framework handler
3       return ftf.getFTs(id)
4
5   runFT(ft, proxy):
6       for user in ft.users:
7           (exitcode, traffic) = runFT(ft, proxy, user, 2)
8
9   runFT(ft, proxy, user, ntimes):
10      ftf = getFTF( ) # get the Functional Test Framework handler
11      exitcode = 0
12      traffic = [ ]
13      for (i=0; i<ntimes; i++):
14          proxy.clean( )
15          ftf.runFT(ft, proxy.endpoint, user)
16          while ftf.poll(ft)=="running":
17              sleep(1) # wait a small amount of time
18          iexitcode = ftf.poll(ft)
19          if iexitcode != 0:
20              exitcode = iexitcode # update exitcode if any error
21          itraffic = proxy.getTraffic( )
22          traffic.append(itraffic)
23      return (exitcode, traffic)
```

The function "getFTs(id)" at lines 1-3 returns the functional tests 312 for an SUT 304 indicated by "id". The function "runFT(ft, proxy)" at lines 5-7 calls the functional test framework 308 to run a functional test, indicated by "ft" utilizing a particular proxy 318. The function "runFT(ft, proxy, user, ntimes)" at lines 9-23 returns calls the functional test framework 308 to run the functional test "ft" a number of times: "ntimes." Results of the functional tests may include HTTP traffic 316, which includes request messages sent to the SUT 304 in functional tests 312 and response messages received from the SUT 304 in the functional tests 312.

Turning now to the inference module 330, as described herein, the inference module 330 processes the HTTP traffic 316 and generates labeled HTTP traffic 340. The labeled HTTP traffic 340 includes labels for request message/response message pairs that are session unique and/or user unique. A message is session unique if it includes a session identifier "sid" and the sid changes from traffic session to traffic session. A message is user unique if one or more element values of the message are the same for all traffic sessions related to a particular user 310 but change for other users. The labels provided by the inference module 330 may be used by the state-changing request extractor 332 as described herein.

The state-changing request extractor 332 uses the labelled HTTP traffic 340 to select state-changing requests 342. The state-changing request extractor 332, for example, may apply a set of one or more state-changing request heuristic criteria 322 to the labeled HTTP traffic 340. Request messages from the labeled HTTP traffic 340 can be given a state-changing (SC) score based on the state-changing request heuristics 322. Request messages with scores meeting a threshold may be considered state-changing requests 342.

State-changing requests 342, as described herein, are requests that change a state of the user 310 and/or the SUT 304. Requests that change the state of the SUT 304 may be referred to as server-side state-changing requests and may include, for example, requests that are linked with a server-side database transaction. Requests that change the state of the user are referred to herein as client-side state changing requests and can include, for example, requests that install cookies to the browser 306 or otherwise modify the memory of the browsers.

The state-changing request heuristic criteria 322, in some examples are chosen to correspond to the functionalities of the SUT 304. SUT functionality, in some examples, can be categorized into a series of functionality categories, such as the example categories described below. State-changing requests related to functionalities in one of these categories may be described by a set of one or more heuristic criteria. Examples functionality categories are described below:

Form-Based Registration: Form-based registration describes a process proposed to SUT 304 users to create a personal account on a website or web application. Request messages from the browser 306 may provide information including, for example, personal information about the user. In some examples, the personal information is grouped and incorporated into an HTML form tag.

Form-based login: Form-based login describes a process for a logged-out user to log-in to an account at the SUT 304. Request messages according to this functionality may include authentication credentials such as a user name, e-mail address, password, etc.

SSO-login: SSO-login describes a process to log in to a website using a Single Sign On (SSO) protocol in which the authentication is performed by a third party service. The third party service may be, for example, a social network such as Facebook or Twitter, an enterprise SSO service, etc. According to an SSO-login, the user 310 provides authentication information to a third-party website that redirects the user 310 back to the SUT 304, for example, with a token that can be recognized and validated by the SUT 304.

URL-based account activation: URL-based account activation describes a process that includes the activation and/or creation of an account on a SUT 304 using a link generated by the SUT 304. For example, the SUT 304 may send a link to an e-mail account of the user 310. The user 310 may select the link to complete the account activation.

SSO-account association: SSO-account association describes a process for linking a user generated account on a website with an account on third-party SSO service. This may allow the user 310 to log-in to the SUT 304 using a form-based login or SSO-login.

E-mail/password change: E-mail/password change describes a process in which the user 310 resets or changes a password or e-mail associated with an account.

As described herein, the state-changing request extractor 332 may utilize heuristic criteria that are based on functionalities provided by a particular SUT 304 and/or a range of heuristic criteria across multiple types of functionalities. Example state-changing request heuristic criteria based on the example functionalities above are described below. The various criteria describe situations in which the SC score for a request message is incremented. As described, if the SC score for a request message and/or request message/reply message pair is greater than a threshold, the state-changing request extractor 332 determines that the request message and/or request message/response message pair is a state-changing request 342. The amount by which the SC score is increased can vary by heuristic criterion and/or by request message.

Cookies: A cookies heuristic criterion may increase the SC score for a request message if the request message sets more than a threshold number of cookies in the browser 306. The cookies, for example, can describe session management, tracking, personalization of the user experience, etc. Because each cookie may hold only a single piece of information, the SUT 304 may install a large number of cookies when the user 310 logs-in to the SUT 304. A cookies heuristic criterion, as described, may be associated with a form-based or SSO login functionality at the SUT 304. In some examples, the SC score for a request message is increased based on the number of cookies added. For example, if more cookies are added the SC score may be increased by a higher value.

Slow POST: A slow POST heuristic criterion may increase the SC score of a request message that includes a POST request. A POST request may be a request that the SUT 304 accept data, such as, for example, registration data (form-based registration or URL-based account activation. URL-based account activation), login data (form-based login, SSO-login, email/password change). The amount by which SC score is increased may depend on the response time (e.g., the time between the sending of a request message and the receipt of the corresponding response message). A longer response time may indicate a database transaction at the SUT 304, and accordingly longer response times may lead to higher increases to the SC score.

Access-Control-Allow-Credentials header: An access-control-allow-credentials header heuristic criterion may increase the SC score for if the access-control-allow-credentials header indicates that a request message includes user credentials. Such a request message may be likely, for example, for SUTs 304 that include any functionality in which a request message includes user credentials, such as, for example, form-based registration, form-based login, SSO-login, e-mail/password change, etc.

Cache-Control header: A cache-control header heuristic criterion may increase the SC score for request message/ response message pairs that to not allow caching by the browser. With such requests, caching by the browser would invalidate a request to the SUT 304. This may be an indication that the request has a server-side consequence which may indicate a probable state-changing action.

Upgrade-Insecure-Requests header: An upgrade-insecure-requests header heuristic criterion may increase the SC score for request message/response message pairs which include an upgrade-insecure-requests header in the request. This may indicate the client's preference are for an encrypted and authenticated response, which may in turn indicate sensitive data, such as user credential data, in the request message. This may occur, for example, with form-based registration, form-based login, and e-mail/password change functionality.

Password keyword: A password keyword heuristic criterion increases the SC score for a request message that includes one or more keywords indicating the presence of a password. This may relate to functionalities that include a password, such as form-based registration, form-based login, SSO-login, etc. Example keywords can include: pass, key, pwd, passwd, password, secret, etc.

Registration key word: A registration keyword heuristic criterion increases the SC score for a request message that includes one or more keywords indicating a registration. This may relate to form-based registration functionality. Example registration keywords include register and signup.

Sensitive data keyword: A sensitive data keyword heuristic criterion increases the SC score for a request message that includes one or more keywords indicating sensitive data. This may occur, for example, with form-based registration, form-based login, and e-mail/password change functionality. Example keywords indicating sensitive data include: sex, gender, city, country, street, postal, zip, age, birth, years, last, and first.

Session cookies keyword: A session cookie keyword heuristic criterion increases the SC score for a request message that includes one or more keywords indicating session cookies. For example, request message/response message pairs associated with form-based registration and SSO-login functionalities may include session cookies indicating the logged-in user. Example session cookies keywords may include: session, cfid, cftoken, sessid, sid, zenid, viewstate, siteserver.

Login key word: A login key word heuristic criterion increases the SC score for a request message that includes one or more keywords indicating a login. Such keywords may be present, for example, for request message/response message pairs associated with form-based login and/or SSO-login. Example login keywords include login, signin, and signon.

Success keyword. A success keyword heuristic criterion increases the SC score for a request message that includes one or more keywords in the body of the response message. For example, a response of a state-changing action may notify the browser 305 of the user if the action took place or if it was rejected. Example success keywords include success and ok.

SSO services: An SSO service heuristic criterion increases the SC score for a request message in which the request message has the same pattern as the authentication statements for common SSO providers such as, for example, Google, Facebook, or Twitter.

Double email. A double email heuristic criterion increases the SC score for request message/response message pairs in which an email address is found a predetermined number of times, such as two times, inside the body of the request message. This could indicate email/password change functionality. For example, when an email address is sent twice in a request message, an email change action could take place. The new email may be required to be entered two times so the server is sure it is the correct one.

Double password. A double password heuristic criterion increases the SC score for request message/response message pairs in which a password is found a predetermined number of times, such as two times, inside the body of the request message. This could indicate e-mail/password change functionality. For example, when a password is changed, the corresponding request message may include the new password two times so the server is sure that it has the correct new password.

HypterText Markup Language (HTML) form request: An HTML form request heuristic criterion increases the SC score for request message/response message pairs in which the request message was filed by an HTML form, for example, rather than an XMLHTTPRequest (XHR) form. For example. HTML forms may be more likely to be used in state-changing actions since they may embed by default cookies saved in the user browser 306.

Rate limit: A rate limit heuristic criterion increases the SC score for request message/response message pairs in which a rate-limit header is found in the request message. For example, state-changing request messages may be translated as expensive server-side actions in the form of database transactions, to protect attacks of denial of service. As a result, such requests may be rate-limited.

The example state-changing request heuristic criteria 322 described herein are provided for illustrative purposes. In various implementations, the state-changing request extractor 332 can apply these, or other heuristic criteria, or combinations thereof, in any suitable arrangement. TABLE 1 below shows one example arrangement of state-changing request heuristic criteria 322 that can be used for SUTs 304 having different functionalities:

TABLE 1

| Strategy Name | Form-Reg. | Form-Login | SSO-Login | SSO-Assoc. | Email/password change | Generic |
| --- | --- | --- | --- | --- | --- | --- |
| Cookies | X | X | X | | | |
| Password | X | X | X | X | | |
| Registration Keyword | X | | | | | |
| Slow POST | X | X | X | X | X | X |
| Allow-Cred. Header | X | X | X | X | | |
| Cache-Control header | X | X | X | X | X | |
| Sensitive data keyword | X | | | | | |
| Session Cookies keyword | X | X | X | | | |
| Login keyword | | X | X | X | | |
| SSO Services | | | X | X | | |
| Double Email | | | | | X | |
| Double Password | | | | | X | |
| HTML Form Request | X | X | X | X | X | X |
| Upgrade-Insecure Header | X | X | X | X | X | X |

TABLE 1-continued

| Strategy Name | Form-Reg. | Form-Login | SSO-Login | SSO-Assoc. | Email/password change | Generic |
|---|---|---|---|---|---|---|
| Success keyword | X | X | X | X | X | X |
| Rate Limit | | | | | | X |

Also, although the example state-changing request heuristic criteria 322 described herein indicate that the SC score for a request message is to be increased, in some examples, the logic may be reversed. That is, a heuristic criterion may decrease the SC score of an identified request message/response message pair. In this arrangements, request message/response message pairs with an SC score below a threshold value may be considered state-changing requests 342.

The tamper test engine 334 uses the state-changing requests 342 generated by the state-chanting request extractor 332 to run tamper tests. Executing a tamper test for a state changing request 342 may include re-running the functional test associated with the state-changing request 342, albeit with a tampered request message. For example, the tamper test engine may instruct the functional test framework 308 to re-run the functional test 312. The tamper test engine 334 may also instruct the proxy 318 to replace the state-changing request message from the functional test 312 with a tampered test message, as described herein.

The tamper test engine 334 may generate a tampered request message corresponding to a request message, in some examples, based on the nature of the request message, for example, whether the state-changing request message is a pre-authentication request message or a post-authentication request message. A pre-authentication request message is a request message that is sent to the SUT 304 before the user 310 is authenticated to the SUT 304. For example, a pre-authentication request message may be associated with form-registration, form-login, SSO-login, and URL-based activation SUT functions. Post-authentication request messages may be request messages sent to the SUT 304 after the user 310 is authenticated. For example, a post-authentication request message may be associated with SSO-association, e-mail/password change, and other SUT functions. In some examples, the state-changing request extractor 332 may label state-changing request messages as pre-authentication or post-authentication, for example, based on the heuristic criteria that contributed to the SC score for the state-changing request messages.

A tampered request message for a pre-authentication state-changing request message may be generated to simulate the kinds of CSRF attacks that are launched using pre-authentication requests. For example, a pre-authentication request may be used to target a user by authenticating or re-authenticating the user as the attacker in the SUT 304 so that the attacker can use the SUT 304 to track and discover activities of the user on the SUT 304. To simulate this attacker strategy, the tamper test engine 334 and/or proxy 318 generates a tampered request message by relaunching a functional test and by preserving the body of the request message, a content-type header of the request message, and a content-length header when the candidate request is found in the traffic. Further, a header of the request message indicating the referrer is modified to refer to a Universal Resource Locator (URL) associated with a simulated attacker. (A referrer is an HTTP header field indicating the URL or other address that linked to the resource being requested, here the SUT 304. If a protocol other than HTTP is used, a similar header field may be used.) This may simulate the user 310 browsing the simulated attacker website. Other fields of the request message may be removed. The tampered request message, generated by the tamper test engine 334 and/or the proxy 318, is provided to the SUT 304, which replies with a traffic-tampered response message. The tampered request message/traffic-tampered response message pair may be stored as test result data 344 at the outcome data structure 321.

A tampered request message for a post-authentication state-changing request message may be generated to simulate the kinds of CSRF attacks that are launched using post-authentication request messages. For example, a post-authentication request message may be used by the attacker to execute privileged actions at the SUT 304 while the user is browsing the attacker website. In various examples, the tamper test engine 334 injects simulated attacker values into the state-changing request message as attacker values. To include the simulated attacker values into an action carried out by the SUT 304 as the user/victim, the tamper test engine 334 and/or proxy 318 modifies the executed functional test to execute with a different testing user. For example, the state-changing request message may be tampered by preserving the content-type header, the content-length header and the cookies. This may preserve the identity of the user/victim. The header carrying the referrer may be modified to the simulated attacker URL. For state-changing request messages previously labeled as session unique or user unique, values in the body and/or URL querystring are modified and replaced with simulated attacker values. Other fields may be removed.

The oracle module 336 reviews the test results 334 generated by the tamper test engine 334 and original test results to determine which tested state-changing request messages are vulnerable. This is indicated as vulnerability data 348. In some examples, the oracle module 336 also considers labeled HTTP traffic 340 and state-changing requests 342.

In various examples, the oracle module 336 utilizes oracle heuristic criteria 324 to detect vulnerable request messages. Example oracle heuristic criteria 324 include a response comparison heuristic criterion, a functional test exit code heuristic criterion, and/or a success rules heuristic criterion.

A response comparison heuristic criterion may involve comparing a traffic-tampered response message returned in the tamper test associated with a state-changing request message with the response message associated with the original functional test (an un-tampered response message) the state-changing response message. The comparison could determine that the un-tampered response message is similar to the tampered response message or not similar. If the response messages are similar, it shows that the SUT 304 responded similarly to both the tampered and un-tampered request messages. This, in turn, indicates that the state-changing request message is potentially vulnerable. On the other hand, if the response messages are not similar, it shows that the SUT 304 responded differently to the tampered and un-tampered message. This may indicate that the SUT 304 refused to execute the tampered request message and that the state-changing request message is not vulnerable.

The response comparison heuristic criterion may include sub-heuristic criteria relating to different parts of the response messages. The sub-heuristic criteria return scores that indicate a level of similarity or dissimilarity between the response messages. The oracle module 336 may sum the scores across all considered sub-heuristic criteria. If the summed value meets a threshold value, the response comparison heuristic criterion returns an indication that the response messages are similar. On the other hand, if the summed value fails to meet the threshold value, the response comparison heuristic criterion returns an indication that the response messages are not similar.

One example sub-heuristic criterion is a status code comparison. This criterion results in a score indicating the degree of difference between the status codes of the tampered response message and un-tampered response messages. If the status codes match, for example, a score of one may be returned. If the status codes do not match, but are in the same class, a lower number will be returned (e.g., 0.2).

Another example sub-heuristic criterion is a cookie comparison. This criterion is based on a misalignment of cookies in the traffic-tampered and un-tampered responses. The misalignment of cookies is the difference of the total number of cookies set and a symmetric difference between the cookies set. The symmetric difference, which is also known as a disjunctive union, describes the set of cookies that are present in one of the traffic-tampered response or un-tampered response, but not the other. The more the misalignment varies, the more the responses are considered different. Consider an example in which an SUT 304 sets several cookies to persist the user's session on the user's browser 306 upon authentication. If an attack is detected, however, the SUT 304 may not set those cookies. A cookie comparison may return a score indicating a degree of difference between the cookies of the response messages.

A header comparison is an example sub-heuristic criterion that is based on misalignment of headers for the two responses. The misalignment of headers may be a difference in the total number of headers and a symmetric difference between the headers. For example, the SUT 304 on a POST endpoint may reply to untampered request messages with a set of ten headers, including some information about the SUT 304, framework used, cache, etc. When an attack is detected, information about the server and framework are stripped out and caching may be denied to the user's browser 306, leading to header misalignment. A cookie comparison may return a score indicating a degree of difference between the cookies of the response messages.

A body length comparison is another example sub-heuristic criterion that is based on a difference in length between the bodies of the two responses. For example, when the user 310 puts an item in a shopping cart, the SUT 304 may reply back with a success message, for example, in a JSON format. If the SUT 304 detects an attack, however, it may respond with an error message. The error message may have a different length than the success message. A body length comparison may return a score indicating a difference in body length between the response messages.

A path comparison is another example sub-heuristic criterion that is based on determining, if the responses are redirects, whether they redirect to the same location. The same location may be indicated by the path of the redirect URL, for example, without considering any parameter in the query string. Consider an example in which the SUT 304 detects an attack on a specific endpoint that is responsible for payments. The SUT 304 may automatically expire the session of the user from the server-side and reply back with a redirect to the login page instead of bringing the user to a receipt page. A path comparison may return a score indicating that the paths of the responses match or do not match.

Another example oracle heuristic criterion 324 is a functional test exit code value. As described herein, functional tests may generate an exit code indicating the success or failure of the functional test. A functional test exit code value can indicate that the functional test run with the tampered request message was successful or unsuccessful. If the functional test run with the tampered request message is successful, it may indicate a vulnerability with the tested state-changing request message. On the other hand, if the functional test run with the tampered request message is unsuccessful, it may indicate a lack of a vulnerability for the considered state-changing message. In some examples, if the functional test run with the tampered request message is unsuccessful, the rest may be run again with the un-tampered state-changing request message to verify that the failure of the tampered functional test was due to the tampered request message and not due to other factors.

A success rules value is another example oracle heuristic criterion. For example, a functional test may have one or more success rules that define whether the functional test was successful. Consider an example in which the state-changing request message was to place an item in a shopping cart. A graphical indication of the shopping cart may be provided by the response message. A success rule may involve analyzing the response message to determine if the shopping cart indicated a new item. If the success rules for a functional test are met for a tampered request message, the success rule value would indicate a potential vulnerability, otherwise no potential vulnerability will be indicated.

The oracle module 336, in some examples, aggregates the values of the heuristic criteria for each considered state-changing request message to determine whether that state-changing request message is potentially vulnerable. An example way of aggregating the example heuristic criteria described herein is provided by TABLE 2 below:

TABLE 2

| Heuristic Criterion | | | | | | |
|---|---|---|---|---|---|---|
| Response comparison | True | False | True | False | True | False |
| Functional Test Exit Code | False | False | False | False | True | True |
| Success Rule(s) | Ture | False | False | True | True | True |
| Oracle Output | True | False | False | False | True | True |

The oracle module 336 may generate vulnerability data 348 indicating all of the considered state-changing request messages that are determined to be potentially vulnerable.

The verdict producer 338 may access the vulnerability data 348, test result data 344, state-changing request data 342, and/or labeled HTTP traffic data 340 to produce verdict data 350. Verdict data 350 may be expressed in a format, such as JSON, that is configured for display to the user 310 in a user interface.

EXAMPLES

Example 1 is a system for detecting vulnerabilities in a web application, the system comprising: a programmable processor; and a non-transitory machine-readable medium comprising instructions thereon that, when executed by the programmable processor, cause the programmable processor to perform operations comprising: directing a plurality of request messages to a web application executed at a remote computing device; determining that a first request message of the plurality of request messages describes a state changing request, the determining based at least in part on the first request message and a first response message generated by the web application in response to the first request message; generating a first tampered request message based at least in part on the first request message; directing the first tampered request message to the web application; and determining that the first request message indicates a vulnerability of the web application, the determining based at least in part on the first tampered request message and a first traffic-tampered response message generated by the web application in response to the first tampered request message.

In Example 2, the subject matter of Example 1 optionally includes wherein determining that the first request message describes a state changing request comprises: modifying a state-changing score for the first request message based at least in part on a first criterion; modifying the state-changing score for the first request message based at least in part on a second criterion; and determining that the state-changing score meets a state-changing request message threshold.

In Example 3, the subject matter of Example 2 optionally includes wherein determining that the first request message describes a state changing request further comprises determining that the first response message comprises more than a threshold number of cookies.

In Example 4, the subject matter of any one or more of Examples 2-3 optionally includes wherein determining that the first request message describes a state changing request further comprises determining that the first request message comprises a first keyword.

In Example 5, the subject matter of any one or more of Examples 1-4 optionally includes the operations further comprising determining that the first request message is a pre-authentication request message, wherein generating the first tampered request message comprises: modifying a referrer header field of the first request message: and removing at least one cookie from the first request message.

In Example 6, the subject matter of any one or more of Examples 1-5 optionally includes the operations further comprising determining that the first request message is a post-authentication request message, wherein generating the first tampered request message comprises: modifying a referrer header field of the first request message; and replacing at least a portion of a body of the first request message.

In Example 7, the subject matter of any one or more of Examples 1-6 optionally includes the operations further comprising determining that a first field of the first response message matches a corresponding field of the first traffic-tampered response message.

In Example 8, the subject matter of any one or more of Examples 1-7 optionally includes the operations further comprising determining that a first test exit code associated with the first response message matches a second test exit code associated with the first traffic-tampered response message.

In Example 9, the subject matter of any one or more of Examples 1-8 optionally includes the operations further comprising determining that the first traffic-tampered response message indicates a result requested by the first tampered request message.

Example 10 is a method for detecting vulnerabilities in a web application, the method comprising: directing, by a testing utility, a plurality of request messages to a web application, wherein the testing utility is executed at a first computing device and the web application is executed at a second computing device: determining, by the testing utility, that a first request message of the plurality of request messages describes a state changing request, the determining based at least in part on the first request message and a first response message generated by the web application in response to the first request message; generating, by the testing utility, a first tampered request message based at least in part on the first request message; directing, by the testing utility, the first tampered request message to the web application; and determining, by the testing utility, that the first request message indicates a vulnerability of the web application, the determining based at least in part on the first tampered request message and a first traffic-tampered response message generated by the web application in response to the first tampered request message.

In Example 11, the subject matter of Example 10 optionally includes wherein determining that the first request modifying a state-changing score for the first request message based at least in part on a first criterion: modifying the state-changing score for the first request message based at least in part on a second criterion; and determining that the state-changing score meets a state-changing request message threshold.

In Example 12, the subject matter of Example 11 optionally includes wherein determining that the first request message describes a state changing request further comprises determining that the first response message comprises more than a threshold number of cookies.

In Example 13, the subject matter of any one or more of Examples 11-12 optionally includes wherein determining that the first request message describes a state changing request further comprises determining that the first request message comprises a first keyword.

In Example 14, the subject matter of any one or more of Examples 10-13 optionally includes determining that the first request message is a pre-authentication request message, wherein generating the first tampered request message comprises: modifying a referrer header field of the first request message; and removing at least one cookie from the first request message.

In Example 15, the subject matter of any one or more of Examples 10-14 optionally includes determining that the first request message is a post-authentication request message, wherein generating the first tampered request message comprises: modifying a referrer header field of the first request message; and replacing at least a portion of a body of the first request message.

In Example 16, the subject matter of any one or more of Examples 10-15 optionally includes determining that a first field of the first response message matches a corresponding field of the first traffic-tampered response message.

In Example 17, the subject matter of any one or more of Examples 10-16 optionally includes determining that a first test exit code associated with the first response message matches a second test exit code associated with the first traffic-tampered response message.

In Example 18, the subject matter of any one or more of Examples 10-17 optionally includes determining that the first traffic-tampered response message indicates a result requested by the first tampered request message.

Example 19 is a non-transitory machine-readable medium comprising instructions thereon that, when executed by a programmable processor, cause the programmable processor to perform operations comprising: directing a plurality of request messages to a web application executed at a remote computing device; determining that a first request message of the plurality of request messages describes a state changing request, the determining based at least in part on the first request message and a first response message generated by the web application in response to the first request message;

generating a first tampered request message based at least in part on the first request message: directing the first tampered request message to the web application; and determining that the first request message indicates a vulnerability of the web application, the determining based at least in part on the first tampered request message and a first traffic-tampered response message generated by the web application in response to the first tampered request message.

In Example 20, the subject matter of Example 19 optionally includes wherein determining that the first request message describes a state changing request comprises: modifying a state-changing score for the first request message based at least in part on a first criterion; modifying the state-changing score for the first request message based at least in part on a second criterion; and determining that the state-changing score meets a state-changing request message threshold.

Figure 4:
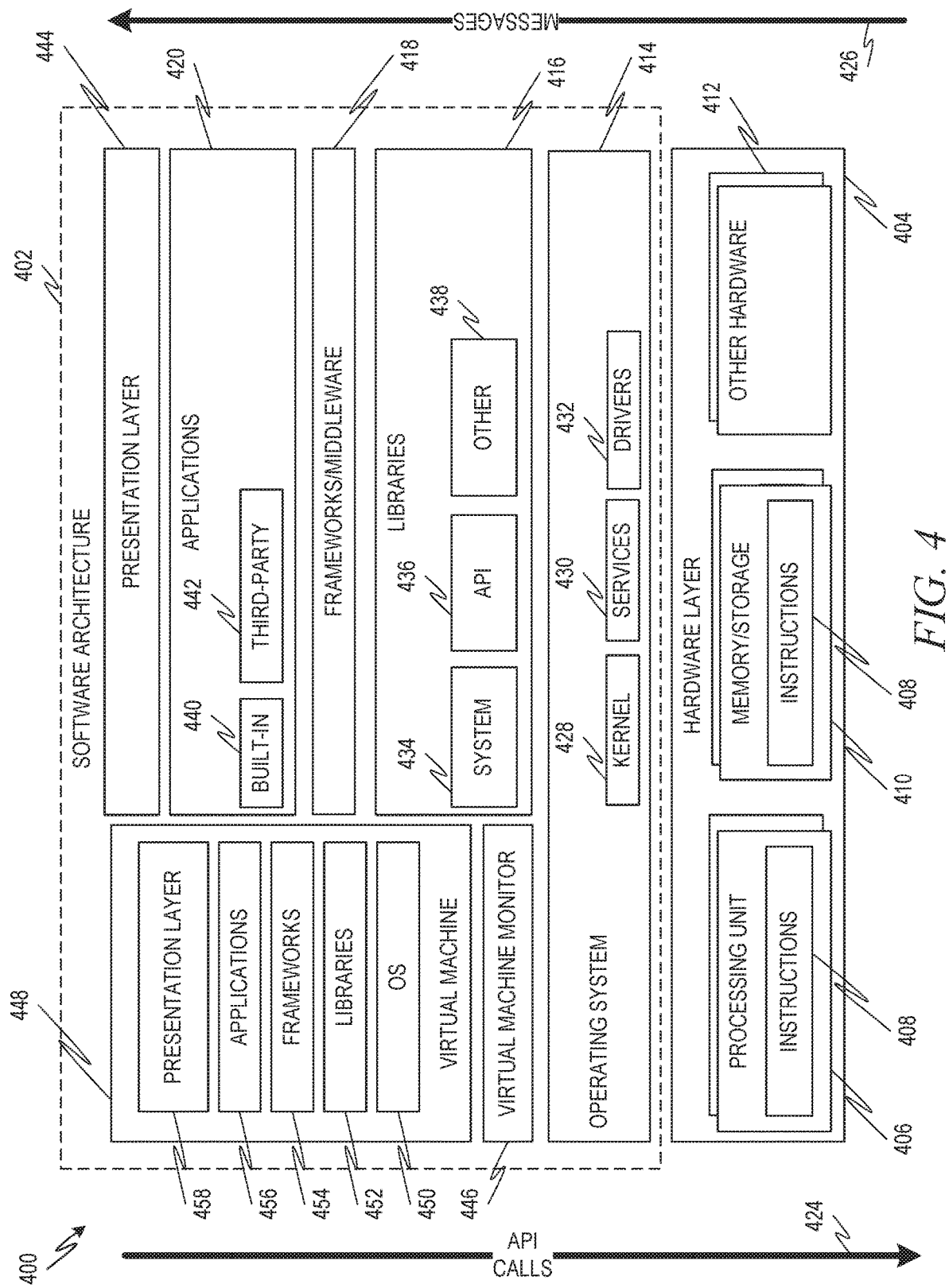
FIG. 4 is a block diagram showing one example of a software architecture for a computing device.

FIG. 4 is a block diagram 400 showing one example of a software architecture 402 for a computing device. The architecture 402 may be used in conjunction with various hardware architectures, for example, as described herein. FIG. 4 is merely a non-limiting example of a software architecture and many other architectures may be implemented to facilitate the functionality described herein. A representative hardware layer 404 is illustrated and can represent, for example, any of the above referenced computing devices. In some examples, the hardware layer 404 may be implemented according to the architecture of the computer system 500 of FIG. 5.

The representative hardware layer 404 comprises one or more processing units 406 having associated executable instructions 408. Executable instructions 408 represent the executable instructions of the software architecture 402, including implementation of the methods, modules, subsystems, and components, and so forth described herein and may also include memory and/or storage modules 410, which also have executable instructions 408. Hardware layer 404 may also comprise other hardware as indicated by other hardware 412, which represents any other hardware of the hardware layer 404, such as the other hardware illustrated as part of computer system 500.

In the example architecture of FIG. 4, the software architecture 402 may be conceptualized as a stack of layers where each layer provides particular functionality. For example, the software architecture 402 may include layers such as an operating system 414, libraries 416, frameworks/middleware 418, applications 420 and presentation layer 444. Operationally, the applications 420 and/or other components within the layers may invoke application programming interface (API) calls 424 through the software stack and access a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. In some examples, the services 430 include an interrupt service. The interrupt service may detect the receipt of an interrupt and, in response, cause the architecture 402 to pause its current processing and execute an interrupt service routine (ISR) when an interrupt is accessed.

The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules. In some examples, libraries 416 may provide one or more APIs serviced by a message oriented middleware.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. Third-party applications 442 may include any of the built-in applications 440 as well as a broad assortment of other applications. In a specific example, the third-party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 442 may invoke the API calls 424 provided by the mobile operating system such as operating system 414 to facilitate functionality described herein.

The applications 420 may utilize built-in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware computing device. A virtual machine 448 is hosted by a host operating system (operating system 414) and typically, although not always, has a virtual machine monitor 446, which manages the operation of the virtual machine 448 as well as the interface with the host operating system (i.e., operating system 414). A software architecture executes within the virtual machine 448 such as an operating system 450, libraries 452, frameworks/middleware 454, applications 456 and/or presentation layer 458. These layers of software architecture executing within the virtual machine 448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 5:
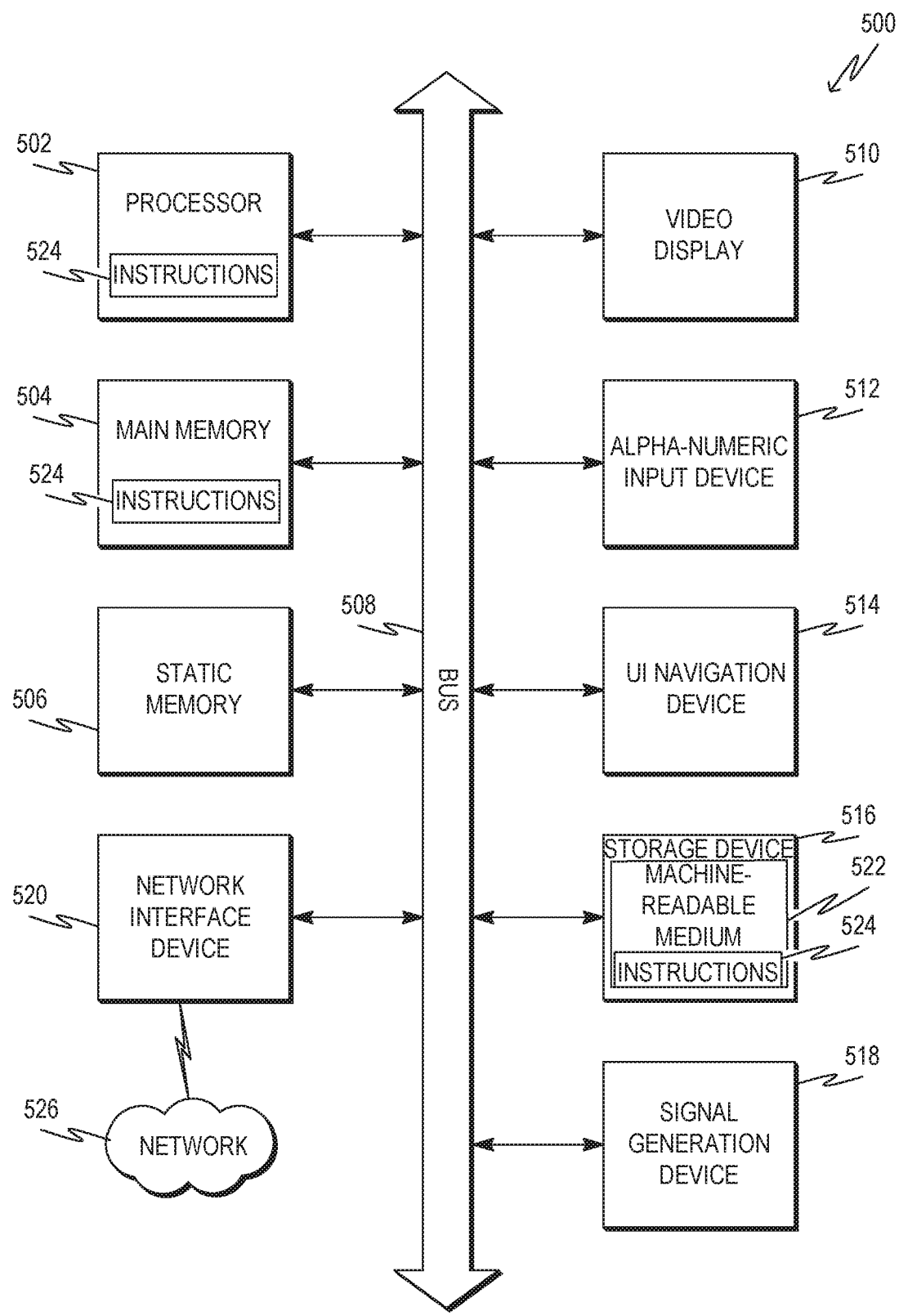
FIG. 5 is a block diagram of a machine in the example form of a computer system within which instructions may be executed for causing the machine to perform any one or more of the methodologies discussed herein.

FIG. 5 is a block diagram of a machine in the example form of a computer system 500 within which instructions 524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation (or cursor control) device 514 (e.g., a mouse), a disk drive device 516, a signal generation device 518 (e.g., a speaker), and a network interface device 520.

Machine-Readable Medium

The disk drive device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media 522.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding, or carrying instructions 524 for execution by the machine and that cause the machine to perform any one or more of the methodologies of the present disclosure, or that is capable of storing, encoding, or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks: magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for detecting vulnerabilities in a web application, the system comprising:
    a programmable processor; and
    a non-transitory machine-readable medium comprising instructions thereon that, when executed by the programmable processor, cause the programmable processor to perform operations comprising:
        directing a plurality of request messages to a web application executed at a remote computing device;
        determining that a first request message of the plurality of request messages describes a state changing request, the determining based at least in part on a first response message generated by the web application in response to the first request message;
        selecting the first request message for use in generating a first tampered request message, the selecting being based at least in part on the determining that the first request message describes a state changing request;
        determining that the first request message is a post-authentication request message sent to the web application after a user associated with the first request message has been authenticated to the web application;
        generating the first tampered request message based at least in part on the first request message and on the determining that the first request message is a post-authentication request message, the generating of the first tampered request message comprising:
            modifying a referrer header field of the first request message; and
            replacing at least a portion of a body of the first request message;
        directing the first tampered request message to the web application;
        determining that the first request message indicates a vulnerability of the web application, the determining based at least in part on the first tampered request message and a first traffic-tampered response message generated by the web application in response to the first tampered request message;
        determining that a second request message of the plurality of request messages describes a state changing request;
        selecting the second request message for use in generating a second tampered request message;
        determining that the second request message is a pre-authentication request message; and
        generating the second tampered request message at least in part by:
            modifying a referrer header field of the second request message; and
            removing at least one cookie from the second request message.

2. The system of claim 1, wherein determining that the first request message describes a state changing request further comprises determining that the first response message comprises more than a threshold number of cookies.

3. The system of claim 1, wherein determining that the first request message describes a state changing request further comprises determining that the first request message comprises a first keyword.

4. The system of claim 1, the operations further comprising determining that a first field of the first response message matches a corresponding field of the first traffic-tampered response message.

5. The system of claim 1, the operations further comprising determining that a first test exit code associated with the first response message matches a second test exit code associated with the first traffic-tampered response message.

6. The system of claim 1, the operations further comprising determining that the first traffic-tampered response message indicates a result requested by the first tampered request message.

7. A method for detecting vulnerabilities in a web application, the method comprising:
    directing, by a testing utility, a plurality of request messages to a web application, wherein the testing utility is executed at a first computing device and the web application is executed at a second computing device;
    determining, by the testing utility, that a first request message of the plurality of request messages describes a state changing request, the determining based at least in part on a first response message generated by the web application in response to the first request message;
    selecting, by the testing utility, the first request message for use in generating a first tampered request message, the selecting being based at least in part on the determining that the first request message describes a state changing request;
    determining that the first request message is a post-authentication request message sent to the web application after a user associated with the first request message has been authenticated to the web application;
    generating, by the testing utility, the first tampered request message based at least in part on the first request message and on the determining that the first request message is a post-authentication request message, the generating of the first tampered request message comprising:
        modifying a referrer header field of the first request message; and
        replacing at least a portion of a body of the first request message;
    directing, by the testing utility, the first tampered request message to the web application;
    determining, by the testing utility, that the first request message indicates a vulnerability of the web application, the determining based at least in part on the first tampered request message and a first traffic-tampered response message generated by the web application in response to the first tampered request message;

determining that a second request message of the plurality of request messages describes a state changing request;

selecting the second request message for use in generating a second tampered request message;

determining that the second request message is a pre-authentication request message; and generating the second tampered request message at least in part by:
- modifying a referrer header field of the second request message; and
- removing at least one cookie from the second request message.

8. The method of claim 7, wherein determining that the first request message describes a state changing request further comprises determining that the first response message comprises more than a threshold number of cookies.

9. The method of claim 7, wherein determining that the first request message describes a state changing request further comprises determining that the first request message comprises a first keyword.

10. The method of claim 7, further comprising determining that a first field of the first response message matches a corresponding field of the first traffic-tampered response message.

11. The method of claim 7, further comprising determining that a first test exit code associated with the first response message matches a second test exit code associated with the first traffic-tampered response message.

12. The method of claim 7, further comprising determining that the first traffic-tampered response message indicates a result requested by the first tampered request message.

13. A non-transitory machine-readable medium comprising instructions thereon that, when executed by a programmable processor, cause the programmable processor to perform operations comprising:

directing a plurality of request messages to a web application executed at a remote computing device;

determining that a first request message of the plurality of request messages describes a state changing request, the determining based at least in part on a first response message generated by the web application in response to the first request message;

selecting the first request message for use in generating a first tampered request message, the selecting being based at least in part on the determining that the first request message describes a state changing request;

determining that the first request message is a post-authentication request message sent to the web application after a user associated with the first request message has been authenticated to the web application;

generating first tampered request message based at least in part on the first request message and on the determining that the first request message is a post-authentication request message, the generating of the first tampered request message comprising:
- modifying a referrer header field of the first request message; and
- replacing at least a portion of a body of the first request message;

directing the first tampered request message to the web application;

determining that the first request message indicates a vulnerability of the web application, the determining based at least in part on the first tampered request message and a first traffic-tampered response message generated by the web application in response to the first tampered request message;

determining that a second request message of the plurality of request messages describes a state changing request;

selecting the second request message for use in generating a second tampered request message;

determining that the second request message is a pre-authentication request message; and generating the second tampered request message at least in part by:
- modifying a referrer header field of the second request message; and
- removing at least one cookie from the second request message.

14. The medium of claim 13, wherein determining that the first request message describes a state changing request further comprises determining that the first response message comprises more than a threshold number of cookies.

15. The medium of claim 13, wherein determining that the first request message describes a state changing request further comprises determining that the first request message comprises a first keyword.

* * * * *